United States Patent [19]

Hammer et al.

[11] Patent Number: 5,736,179
[45] Date of Patent: Apr. 7, 1998

[54] TUBULAR FOODSTUFF CASING HAVING A CHITOSAN COATING

[75] Inventors: Klaus-Dieter Hammer, Mainz; Hermann Winter, Wiesbaden, both of Germany

[73] Assignee: Hoechst Aktiengesellschaft, Frankfurt am Main, Germany

[21] Appl. No.: 928,027

[22] Filed: Aug. 11, 1992

[30] Foreign Application Priority Data

Aug. 21, 1991 [DE] Germany .................. 41 27 604.3

[51] Int. Cl.$^6$ ..................................... A22C 13/00
[52] U.S. Cl. ............... 426/105; 138/118.1; 426/135; 428/34.8
[58] Field of Search .................... 426/105, 135, 426/138, 140; 138/118.1; 428/34.8

[56] References Cited

U.S. PATENT DOCUMENTS

| | | |
|---|---|---|
| 1,978,774 | 10/1934 | Voss et al. . |
| 2,901,358 | 8/1959 | Underwood et al. . |
| 3,427,169 | 2/1969 | Rose et al. ............... 426/135 X |
| 3,451,827 | 6/1969 | Bridgeford .................. 99/176 |
| 3,645,760 | 2/1972 | O'Brien et al. ............ 426/135 |
| 3,988,804 | 11/1976 | Regner et al. . |
| 4,357,371 | 11/1982 | Heinrich et al. ........... 427/238 |
| 4,378,017 | 3/1983 | Kosugi et al. ............. 426/138 X |
| 4,396,039 | 8/1983 | Klenk et al. ............... 138/118.1 |
| 4,410,011 | 10/1983 | Andra et al. .............. 138/118.1 |
| 4,543,282 | 9/1985 | Hammer et al. ............. 428/36 |
| 5,089,307 | 2/1992 | Ninomiya et al. ........... 428/35.2 |

FOREIGN PATENT DOCUMENTS

| | | |
|---|---|---|
| 1292708 | 4/1969 | Germany . |
| 2801038 | 7/1979 | Germany . |
| 1-174699 | 7/1989 | Japan . |
| 2-195860 | 8/1990 | Japan . |
| 1201830 | 8/1970 | United Kingdom . |

OTHER PUBLICATIONS

"Chemistry Of Synthetic High Polymers", Chemical Abstracts, vol. III, Oct. 30, 1989, p. 139, Abstract No. 156262H.

*Primary Examiner*—Arthur L. Corbin
*Attorney, Agent, or Firm*—Foley & Lardner

[57] ABSTRACT

A cellulose-based tubular foodstuffs casing having a coating present on its inner and/or outer surfaces, the coating being composed of chitosan chemically linked to the cellulose.

18 Claims, No Drawings

5,736,179

TUBULAR FOODSTUFF CASING HAVING A CHITOSAN COATING

FIELD OF THE INVENTION

The invention relates to a cellulose-based tubular foodstuffs casing having a coating on its inner and/or outer surface, which coating effects improved adhesion of the casing to the filling and, especially in the case of non-perishable sausage types, prevents a separation of the casing during maturation but nevertheless allows easy removal of the casing after maturation. The invention also relates to the use of the foodstuffs casing.

BACKGROUND OF THE INVENTION

As adhesive impregnations, natural albumens (DE-A-609,129) and resin precondensates (DE-B-1,292,708) are known. These compounds are applied to the inside of the foodstuffs casing. When albumens are used the adhesion between the filling and the foodstuffs casing is so strong that non-destructive peeling of the casing is virtually impossible. On the other hand, if synthetic resins are used as the impregnation, the adhesion is so weak that, for example, during the maturation process of a non-perishable sausage, the casing separates from the shrinking filling, which causes creases to form.

An impregnation composed of lecithin and at least one further compound selected from alginate, chitosan and casein is proposed in unpublished German patent application number P 4,121,068.9. However, an advantageous use of solely chitosan chemically linked to the cellulose is not mentioned therein.

With the technical advances in the meat product industry, the quality requirements to be met by sausage casings have become increasingly stringent. Thus, very specific solutions to problems are increasingly required. This also applies to the impregnation effect, where gradations between natural albumens and synthetic resins are in demand.

SUMMARY OF THE INVENTION

Accordingly, it is an object of the present invention to provide a foodstuffs casing whose properties of adhesion to the filling are such that, on filling with sausage meat for non-perishable sausage types, separation of the casing during maturation is prevented, but easy peeling of the casing after maturation is still ensured. At the same time, the casing according to the invention is intended to impede, or possibly prevent, the penetration of cellulytic enzymes such as cellulase.

The foregoing objects are achieved by a foodstuffs casing of hydrated cellulose, which casing has an impregnation of chitosan chemically linked to the cellulose. Optionally, the casing can have a fibrous paper insert.

DETAILED DESCRIPTION OF THE PREFERRED EMBODIMENTS

The foodstuffs casing according to the present invention can be an artificial sausage casing. The coating (impregnation) according to the invention effects, especially where a filling typical of non-perishable sausages is concerned, an adequate adhesion between the inner wall and the filling, so that the casing does not separate during the maturation of the sausage. However, the casing still can be peeled off without problems after maturation, i.e., the adhesion has been adjusted in such a way that non-destructive peeling is still possible.

The foodstuffs casing is composed of a cellulose-based carrier tubing and the coating according to the invention on the inner wall and/or on the outer wall thereof.

The base material for the carrier tubing is cellulose (transparent cellulose film, regenerated cellulose, hydrated cellulose) and is produced in the conventional manner as a seamless tube by coagulation and regeneration, preferably from a viscose solution. It is also possible to use tubings with a bonded seam, which are produced by folding a web and joining the edges (EP-A-0,050,702, EP-A-0 058 240). For the particularly advantageous use of the casing for producing sausages of the non-perishable sausage type, a carrier tube of cellulose with a fiber reinforcement which is embedded, for example in the form of a paper web, in the wall of the carrier tube, is used. Such fiber-reinforced hydrated cellulose casings are produced by applying a viscose solution, which is coagulated and regenerated, from the outside or from the outside and inside to an endless fiber paper formed to give a tube.

The foodstuffs casing can be used as a tube laid flat and wound up on a roll, or in the form of casing sections closed on one side, for filling with filling material. Shirred tubular casings, so-called sticks, also can be produced using conventional shirring devices (U.S. Pat. No. 3,988,804). In this case, it has been found that the coating according to the invention not only exerts the desired influence on the adhesion between the filling and the inner casing wall, but that additional advantages also result on winding-up, storing, shirring and processing. The coating thus ensures that the tubes wound up on a roll do not adhere or stick together. Casing sections do not stick together even on prolonged storage and can be opened without problems before filling with sausage meat, especially on automatic filling machines. In addition, the tubes are particularly slidable and soft and can therefore be shirred without problems.

In accordance with this invention, the coating is composed of chitosan chemically linked to the cellulose. Chitosan is a partially saponified poly-N-acetylglucosamine, which is isolated from the chitin of crustaceans. Each molecule of this natural polymer contains either an amino group or an amide group. Although carboxyl groups are completely absent, a greater affinity than with synthetic resins is obtained.

The free amino groups of the chitosan are available for chemical linking to the hydrated cellulose. The linking is effected without problems by using monoaldehydes and dialdehydes, such as formaldehyde, glyoxal or glutardialdehyde. An aldehyde, 0.3 to 10% by weight, preferably 0.5 to 6% by weight (relative to the quantity of chitosan employed), is added to chitosan in a weakly acidic aqueous solution and, after brief standing, the solution is used as impregnation solution in a concentration (chitosan) of 0.2 to 4% by weight, preferably 0.5 to 2.5% by weight (relative to the total weight of the solution).

The chitosan concentration of the impregnation solution must be adjusted to the various types of casing. For pure cellulose casings, the concentration advantageously is between about 0.5 and about 1% by weight and gives an applied quantity of about 25 to about 60 mg/m² of casing. For fibrous casings treated with viscose on the outside, i.e., those which have been treated with viscose only from the outside, the chitosan concentration is advantageously between about 0.8 and about 2% by weight and gives an applied quantity of about 80 to about 150 mg/m² of casing. For casings double-treated with viscose, i.e., those which have been treated with viscose from the outside and inside, the chitosan concentration is advantageously between about 1.5 and about 2.5% by weight and gives an applied quantity of about 40 to about 100 mg/m² of casing.

In the case of casing types having a smooth inner surface, it is advantageous to add from about 0.5 to about 6% by weight of an oil emulsion (e.g., Softenol® 308 made by Dynamit Nobel; synthetic triglyceride with fatty acids from $C_8$ to $C_{10}$) to the impregnation solution, in order to prevent adhesion or sticking together if rolls are stored for a long time.

Surprisingly, an internal treatment with chitosan is also suitable for anchoring a PVDC coating or acrylate coating; for this purpose, from about 1.0 to about 1.5% of a chitosan solution is used, with which an applied quantity from about 40 to about 60 mg/m² and a surface tension of less than about 34 dynes/m is obtained.

All the percentages given above relate to the total weight of the impregnation solution. The applied quantities relate to the dry weight of the casing. The foodstuffs casing according to the invention is produced by the conventional processes for the production of cellulose-based foodstuffs casings, especially sausage casings.

The application of the inner coating to the inside of the tubular casing is carried out in the conventional manner, for example by filling the tubular casing with a coating fluid (see, e.g., GB-A-1,201,830, U.S. Pat. No. 2 901,358, DE-A-28 01 038 DE-C-30 12 250) The application temperature is usually equal to the ambient temperature, i.e., it is about 15° to 30° C. The tubular casing is advantageously filled with the impregnation solution already during the production of the tubular casing, for example after the precipitation of the hydrated cellulose gel from viscose. The tubing is then dried in the inflated state as usual, the reaction of the N-methylol groups with the OH groups of the cellulose being initiated. The linkage is so firm that not even traces of chitosan are detached even during prolonged boiling with water.

The coating according to the invention has proved itself in practice both for non-reinforced cellulose casings and fiber-reinforced cellulose casings. Very good peeling results were observed in the case of non-perishable sausage types maturing very slowly and under mild conditions in fibrous casings. By means of the coating according to the invention, the adhesion properties of sausage casings, in particular in the case of double-packed or steeped non-perishable sausage, can be adjusted with such accuracy that the good peelability of the casings does not decrease up to the end of the maturation process. Moreover, there is no casing separating and creasing during the maturation process.

As an external coating, the chitosan coating according to the invention surprisingly impedes the penetration of cellulytic enzymes. From about 1.0 to about 1.5% by weight dilutions are used for this purpose. The applied quantity is between about 90 and about 120 mg/m². The cellulase protection is twice as strong as with an external resin coating.

Chitosan has been found to be a completely new impregnating substance for sausage casings of hydrated cellulose, by means of which the possible variations are widened and the setting of specific effects has become possible. Chitosan is a natural polymer which is completely acceptable under food law and which, because of the high molecular weight of the chitosan, can be bound quantitatively to the hydrated cellulose surface with a minimum quantity of aidehyde.

The invention is explained in more detail by the examples which follow, but without restriction to the embodiments specifically described.

EXAMPLE 1

A caliber 60 hydrated cellulose gel tubing with a fibrous paper insert, coated with viscose only on the outside, is filled before the drier inlet with 6 to 8 l of an impregnating solution of the following composition:

| | |
|---|---|
| 9.9 l | of water |
| 0.1 kg | (1% by weight) of Chitosan (Sea Cure ® 110 + L made by Protan GmbH, Norderstedt, Germany) |
| 0.0075 l | (3% by weight relative to chitosan) of glyoxal (40% strentgh by weight) |

The tubing is dried as usual in the inflated state, moistened to a water content of 8–10% by weight and wound up. The applied quantity (established by a nitrogen (N) determination on 200 mg/5 dm² of tubing peeled off) is 138 mg/m².

During the maturation of salami, the casing adheres very well to the meat and can afterwards be readily peeled off (rating: 2.5 on the scale from 1 to 6, 1 meaning no adhesion and 6 meaning no peelability).

EXAMPLE 2

A caliber 45 fiber gel tubing double-treated with viscose (viscose distribution: 40% by weight on the outside, 60% by weight on the inside) was filled with 4 to 6 l of an impregnating solution of the following composition:

| | |
|---|---|
| 9.3 l | of water |
| 0.1 kg | (1% by weight) of chitosan |
| 0.008 l | of glyoxal (40% strength by weight; 3% by weight, relative to chitosan) |
| 0.6 l | Softenol emulsion (50% strength by weight; 3% by weight, relative to solution). |

The tubing is dried as usual in the inflated state, moistened to a water content of 16–18% by weight and shirred to give sticks. The applied quantity is 60 mg/m². During the maturation process, the casings adhere well to the non-perishable sausage meat and, after a maturation period of 4 to 6 weeks, the peelability is rated 2.75.

EXAMPLE 3

A caliber 40 hydrated cellulose gel tubing is filled before the drier inlet with a solution (2 to 3 l) of the following composition:

| | |
|---|---|
| 9.35 l | of water |
| 0.05 kg | (0.5% by weight) of chitosan |
| 0.004 l | of glyoxal (40% strength by weight; 3% by weight, relative to chitosan) |
| 0.6 l | of Softenol ® emulsion (50% strength by weight %; 3% by weight, relative to solution) |

The tubing is dried as usual, moistened to a water content of 16–18% by weight and filled. The applied quantity is 35 mg/m². In the maturation of non-perishable sausage meat, the casing adheres well and can be peeled off without problems after four weeks (rating: 2).

EXAMPLE 4

A solution of the following composition is applied to the outer surface of a caliber 60 fiber gel tubing, treated on the outside with viscose, by means of a roller applicator:

| | |
|---|---|
| 44.355 l | of water |
| 0.6 kg | (1.3% by weight) of chitosan |
| 0.045 l | of glyoxal (40% strength by weight; 3% by weight relative to chitosan). |

The tubing is dried as usual in the inflated state; applied quantity 110 mg/m$^2$.

On treatment with cellulytic enzymes, a weight loss is found which is 25% less than in the case of untreated comparative materials. These fiber casings impregnated on the outside are preferentially suitable for mold-matured non-perishable sausage, in which case, in addition to the inhibition of cellulase, above all good mold adhesion to the surface is also observed.

EXAMPLE 5

A caliber 50 fiber gel tubing double-treated with viscose with a viscose distribution of 50% on the outside and 50% on the inside is treated on the inside with the following solution:

| | |
|---|---|
| 9.9 l | of water |
| 0.1 kg | of chitosan |
| 7.5 ml | of glyoxal (40% strength by weight) |

Applied quantity 53 g/m$^2$

The tubing is then coated on the inside with PVDC dispersion under the usual conditions. Even after boiling for any length of time, the PVDC coating does not detach from the substrate.

What is claimed is:

1. A cellulose-based tubular foodstuffs casing having inner and outer surfaces, said casing comprising a coating on said inner surface, on said outer surface, or on said inner and said outer surfaces, wherein said coating comprises chitosan chemically linked to cellulose present in said casing, and wherein said cellulose has been prepared from a viscose solution by coagulation and regeneration.

2. A foodstuffs casing according to claim 1, which is an artificial sausage casing.

3. A foodstuffs casing according to claim 1, wherein the coating is applied to the inner surface in an amount from about 25 to 100 mg/m$^2$ dry weight.

4. A foodstuffs casing according to claim 1, wherein the coating is applied to the outer surface in an amount from 90 to 120 mg/m$^2$ dry weight.

5. A foodstuffs casing according to claim 1, wherein said coating is applied to the inner surface and is applied from an aqueous coating composition having a chitosan concentration in the range from 0.2 to 4% by weight, relative to the total weight of the aqueous coating composition.

6. A foodstuffs casing as claimed in claim 1, wherein said coating is applied to the outer surface and is applied from an aqueous coating composition having a chitosan concentration in the range from 1 to 15% by weight, relative to the total weight of the aqueous coating composition.

7. A foodstuffs casing according to claim 1, further comprising a fiber reinforcement.

8. A foodstuffs casing according to claim 7, wherein said fiber reinforcement comprises a paper web embedded in the casing.

9. A foodstuffs casing according to claim 1, further comprising an interior layer of a PVDC or acrylate polymer applied to the chitosan coating on the inner surface of said casing.

10. A foodstuffs casing according to claim 9, wherein the quantity of chitosan coating applied to the inner surface is in the range from about 40 to about 60 mg/m$^2$ and has a surface tension of less than about 34 dynes/m.

11. A tubular food product comprising a filling and a foodstuffs casing according to claim 9.

12. A foodstuffs casing according to claim 1, wherein said chitosan coating is on the inside surface of said casing.

13. A foodstuffs casing according to claim 1, wherein said coating consists essentially of chitosan.

14. A tubular food product comprising a filling and a foodstuffs casing according to claim 1, wherein said chitosan coating is in contact with said filling.

15. A foodstuff casing according to claim 1, wherein the chitosan is chemically linked to the cellulose by use of monoaldehydes or dialdehydes.

16. A foodstuff casing according to claim 15, wherein the chitosan is coated onto the casing from an acidic aqueous solution which contains 0.3 to 10% by weight, relative to the amount of chitosan, of the aldehydes.

17. A foodstuff casing according to claim 1, wherein chitosan coating is present on the outer surface of the casing.

18. A foodstuff casing according to claim 1, wherein chitosan coating is present on both the inner and outer surfaces of the casing.

* * * * *